(12) United States Patent
Hall et al.

(10) Patent No.: US 10,546,169 B2
(45) Date of Patent: Jan. 28, 2020

(54) AUGMENTED REALITY NAVIGATION SYSTEM

(71) Applicants: David R. Hall, Provo, UT (US); Jared Eggett, Lehi, UT (US); Ben Swenson, Lehi, UT (US); Steven J. M. Butala, Provo, UT (US); Conrad Rosenbrock, Provo, UT (US)

(72) Inventors: David R. Hall, Provo, UT (US); Jared Eggett, Lehi, UT (US); Ben Swenson, Lehi, UT (US); Steven J. M. Butala, Provo, UT (US); Conrad Rosenbrock, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/928,418

(22) Filed: Mar. 22, 2018

(65) Prior Publication Data

US 2019/0294841 A1    Sep. 26, 2019

(51) Int. Cl.
*G06K 7/10* (2006.01)
*G06T 19/00* (2011.01)
*G06K 7/14* (2006.01)
*G06F 16/955* (2019.01)

(52) U.S. Cl.
CPC ..... *G06K 7/10722* (2013.01); *G06F 16/9554* (2019.01); *G06K 7/1413* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2010/0121480 A1* | 5/2010 | Stelzer | ................... | B65G 1/137 700/215 |
| 2014/0343980 A1* | 11/2014 | Majid | ................... | G06Q 10/20 705/7.12 |
| 2016/0335917 A1* | 11/2016 | Lydecker | ............. | G09B 21/008 |
| 2018/0149753 A1* | 5/2018 | Shin | ........................ | G01S 17/89 |
| 2019/0080274 A1* | 3/2019 | Kovach | .............. | G06Q 10/0639 |

* cited by examiner

*Primary Examiner* — Kristy A Haupt

(57) ABSTRACT

The navigation system includes a series of bar codes and a bar code reader. The bar codes are placed at positions throughout the area to be navigated. The bar code readers scan the bar codes as a user moves through the area to be navigated. The navigation system may include a processor which includes instructions for receiving the user's current position and at least one location the user wishes to reach. The processor assembles the most efficient route from the user's position to the locations the user wishes to reach. The navigation system may include an augmented reality viewing device which receives signals from the processor and displays an augmented reality view to the user. The augmented reality view includes augmented reality images which provide step-by-step instructions from the user's position to the locations the user wishes to reach.

19 Claims, 8 Drawing Sheets

AUGMENTED REALITY NAVIGATION SYSTEM

BACKGROUND

Field of the Invention

This invention relates generally to electronic navigation systems which identify the most efficient route to one or more locations.

Background of the Invention

Often people need to navigate through complicated floorplans within buildings or throughout outdoor venues. Printed maps have been used for navigation but cannot be updated without recreating the printed map. They may not always include sufficient detail to navigate to all locations within the area on the map. Signage may assist in navigation but requires brevity and provides only intermittent instruction. Furthermore, these methods provide static instructions rather than dynamic directions from a user's current position to a desired location.

More recently, navigation systems using global positioning satellite (GPS) technology has become available. A user interface may be experienced through a desktop, laptop or tablet computer screen, or a mobile phone. This technology provides dynamic navigation instructions. However, the reception needed to utilize GPS technology may be unavailable in certain areas. For example, obstacles such as tall buildings or mountains may block needed signals. This technology may also be unavailable within some buildings. Additionally, GPS may not triangulate distances between locations as accurately as needed, particularly when navigating within a relatively small geographical area such as an office building, retail store, or warehouse. Furthermore, the user interface associated with available applications that utilize GPS technology provide a graphic display which often appears much like a printed map, but which changes as the user moves through space. It does not, however, provide a user with a realistic view of the user's surroundings along with navigation instructions.

SUMMARY OF THE INVENTION

The disclosed navigation system includes multiple bar codes which may be located throughout an area to be navigated. These include route bar codes which assist a user in following an optimal route to reach one or more locations within the area. Some embodiments also include destination bar codes which identify specific locations within the area to be navigated so that the system may alert the user on arrival at a desired location.

In some embodiments, the route and destination bar codes may be invisible to the human eye. These bar codes may be printed using ink which reflects light comprising wavelengths which are outside the human visual range, but which a bar code reader or camera may detect.

The disclosed navigation system may include one or more cameras which, in some embodiments, include bar code readers, and which may be directed so that they may read bar codes throughout the area to be navigated. The navigation system may also include at least one bar code reader that may be incorporated within a mobile device, a wearable set of goggles, visor, or optical contact lens which the user may operate while moving through the area to be navigated.

The navigation system may include an augmented reality viewing device which may be incorporated within a mobile device, a set of goggles, a pair of eyeglasses, a visor, or an optical contact lens. Other devices through which a user may view visual input may also include the augmented reality viewing device. This device may allow the user to view the real world while receiving computer-generated navigation instructions in a combined visual experience. For example, a destination bar code may appear to the viewer within the real-world view. The destination bar code may change colors when scanned to indicate that this specific destination bar code is associated with the user's desired destination. Similarly, route bar codes may appear to the viewer within the real-world-view and change colors when scanned if they are on the route to the desired destination. Virtual track lighting may appear along the route guiding the user toward the destination. In some embodiments, the virtual track lighting may appear only on the designated path. In other embodiments, the virtual track lighting may change colors along the path just ahead of the user to guide the user to the destination using the most efficient route. Virtual arrows and textual instructions may direct the user toward the desired destination. These signals may be communicated through a user interface that may be experienced through the augmented reality viewing device. Audible signals may be combined with the augmented reality view to provide additional instructions.

The navigation system may include a processor which may include a memory. The memory may store software in the form of non-transitory computer-readable medium and a database. The database may store the patterns and positions of each of the route and destination bar codes. The non-transitory computer-readable medium may include instructions for receiving a request to help a user navigate from a starting point to at least one location. The processor may include instructions which identify the user's starting point, typically the user's current location. The instructions may design a planned route from the user's starting point to the desired locations using one or more of the following: scans of the bar codes, known locations of the bar codes, and images collected by the cameras. The planned route may be the most efficient path from the user's current position to one or more desired locations. The non-transitory computer-readable medium may comprise instructions for transmitting navigation instructions at least in part in the form of an augmented reality view which the user experiences through the augmented reality viewing device.

The area to be navigated may be any of a variety of environments, either inside a building structure or outdoors. These include, but are not limited to, a warehouse, a retail store, an office building, a healthcare facility, an airport, a bus terminal, a school, a parking lot, an amusement park, and a city.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood regarding the following description and accompanying drawings where.

DETAILED DESCRIPTION OF THE INVENTION

Definitions

Figure 1A:
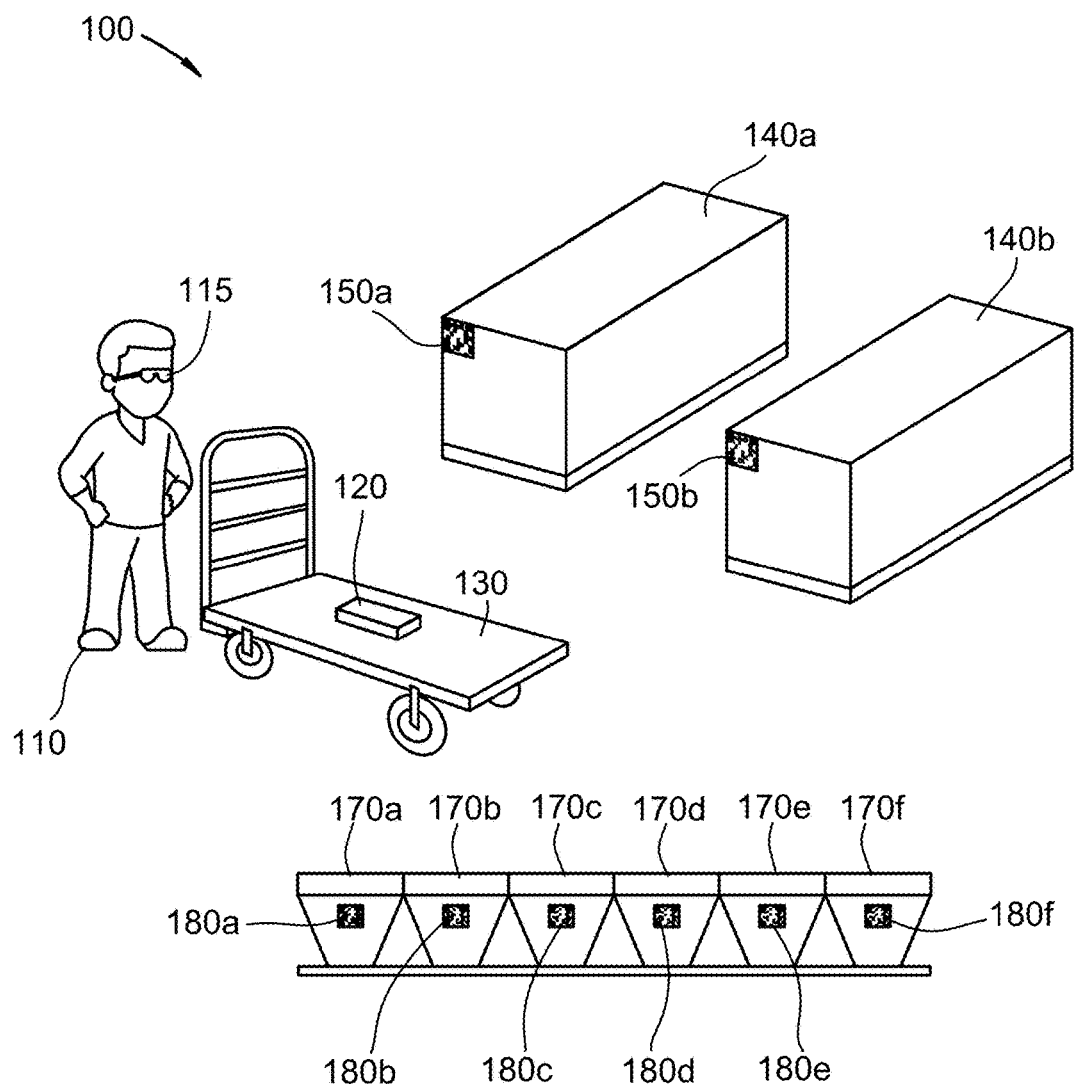
FIG. 1A is a perspective view illustrating a user in a warehouse which uses an embodiment of the disclosed navigation system.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "mobile device" means a portable computing device which provides wired or wireless communication. Examples include smartphones, tablets, and laptop computers.

As used herein, "bar code" means an optical, machine-readable, representation of data. As used herein, a "bar code" may include a one-dimensional (1D), two-dimensional (2D), or a three-dimensional (3D) bar code. In an example, a bar code is a Quick Response code (hereinafter, "QR code,") Data Matrix, a DotCode, or a CrontoSign. In another example, the "bar code" may resemble a 1D Universal Product Code (UPC). A 3D bar code may comprise of a 2D bar code in which the regions of the pattern vary in depth. A 3D bar code may comprise a 2D bar code in which the regions of the pattern vary in color.

As used herein, "augmented reality" means a view in which a computer-generated image is superimposed on a user's view of the real world, thus providing a composite view.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose a navigation system which provides navigation instruction directing a user from a starting point to one or more desired locations using the most efficient route (hereinafter, the "planned route"). The navigation system includes bar codes which may be placed along various routes throughout an area to be navigated. These bar codes may be used as markers which the system uses to direct the user along the planned route to one or more desired locations. Accordingly, these bar codes are referred to herein as "route bar codes." The system may include at least one bar code reader which may read the route bar codes. The bar code reader may be disposed within a user's mobile device, for example, the user's smart phone or tablet.

The navigation system may include an augmented reality viewing device through which the user may receive navigation instructions in an augmented reality platform. In some embodiments, the bar code reader is disposed within an augmented reality viewing device. In some embodiments, the augmented reality view device is a pair of smart goggles, eyeglasses, a visor, or an ocular contact lens that the user wears. For example, the user may wear the goggles, eyeglasses, visor, or contact lens while moving around the area to be navigated. The bar code reader scans the surrounding route bar codes and the user experiences an augmented reality view through the augmented reality viewing device.

The disclosed navigation system may include a user interface (hereinafter, "UI"). The UI may be displayed on any or all of the augmented reality viewing devices, a mobile device, or a desktop computer screen. The UI may provide instructions to follow the planned route as well as indicate when the user has deviated from the planned route followed by rerouting instructions.

The UI may display a variety of virtual images which may be components of the augmented reality view. In an example, the UI may provide an indication when the bar code reader has scanned a route bar code. This indication may comprise an image of the route bar code. The UI may also indicate when the scanned route bar code is along the planned route. For example, the route bar code may change colors or flash when the software on the processor determines that the route bar code is along the planned route. In another example, a user wearing goggles, eyeglasses, a visor, or a contact lens may see virtual track lighting or a virtual arrow on the warehouse floor. These virtual signals may not actually be present but only visible through the UI. A user interfacing through a mobile device may view the track lighting or arrow on a real-world image of the pathway shown on a screen of the mobile device. In some embodiments, the virtual track lighting may change colors along the planned route just ahead of the user thereby providing a signal to follow. In another example, all track lighting within the planned route may be a first color and track lighting that is not along the planned route may be a different color. In yet another example, the UI may produce an audible sound to alert the user that a route bar code on the planned route has been scanned. Combinations of visual and audible signals are also within the scope of this disclosure.

The disclosed navigation system may include one or more cameras which may be placed in strategic positions throughout the area to be navigated. In some embodiments, these cameras may also include bar code readers which may read the bar codes throughout the area to be navigated and transmit the data to a processor. In an example, a single camera or multiple cameras may read 2D bar codes by collecting a graphical image of a 2D bar code. In another example, multiple cameras may collect graphical images of 3D bar codes. The different regions of the 3D bar codes may vary in depth relative to the plane on which a 2D pattern is printed. Multiple cameras may detect the variations in depth, color, or other third dimensions known in the art thereby providing additional options for coding information in the 3D bar code.

Software may be stored in a memory on the processor in the form of non-transitory computer-readable medium. The processor may also store a database which includes the pattern and location of each of the route bar codes. The location of route bar codes may be entered into the processor through data entry techniques known in the art. Alternatively, the cameras may scan the route bar codes throughout the area to be navigated and store their relative positions. An electronic map of the area may be created using the relative locations of the bar codes. Accordingly, when a bar code reader scans route bar codes surrounding the user, the software may identify the location of the user within the area. The software may then determine a planned route to other locations throughout the area to be navigated.

The software stored on the processor may include instructions for receiving a request for an efficient route to reach one or more destinations starting from a user's current location. In some embodiments, this request may be entered into the processor by scanning a bar code associated with each desired destination, keying the request into the processor, by voice commands, or other data entry techniques know in the art. In some embodiments, bar codes associated with destinations may be stored in the memory within the processor along within information about the destination. Accordingly, these bar codes are referred to herein as "destination bar codes." The processor may store the location of each of the destination bar codes in the memory. The software may use the locations of the route bar codes and the destination bar codes to determine an optimal route to a destination bar code (a planned route).

In an example, the destination bar codes may each be associated with a merchandise display. A user entering a retail store may enter a request to navigate to a specific merchandise display into the navigation system. The software may compile a planned route to the desired merchandise display. As the user passes route bar codes, the bar code scanner associated with the user and which may be included within the user's augmented reality viewing device scans the route bar codes and confirms that the user is correctly following the planned route. The UI associated with the augmented reality viewing device communicates navigation instructions to the user as the user proceeds along the planned route. The bar code reader may also scan destination bar codes along the planned route. The UI associated with the augmented reality viewing device may provide a notification when the user reaches the requested merchandise display.

In another example, the destination bar codes may each be associated with a pallet, bin, or other container within a warehouse. The containers may store inventory items which warehouse workers may pick in specific combinations to fill customer orders. The software stored on the processor may include instructions for receiving an order for one or more inventory items. This order may be entered into the processor directly and electronically when a customer sends an electronic order. Alternatively, a worker may enter the order by scanning or keying it into the processor when the order is received.

A warehouse worker may be assigned the task of collecting (picking) the inventory items to fill the customer's order. The software within the navigation system may compile a planned route which is the most efficient route the worker may travel from the worker's present location to pick each of the inventory items in the customer's order. As the worker passes route bar codes, the bar code scanner associated with the worker and which may be included within the worker's augmented reality viewing device scans the route bar codes and confirms that the worker is correctly following the planned route. The UI associated with the worker's augmented reality viewing device periodically communicates navigation instructions as the worker proceeds along the planned route. The bar code reader may also scan destination bar codes along the planned route. When the worker reaches a container which stores an inventory item in the customer's order, the bar code reader scans the destination bar code associated with that container. The UI associated with the augmented reality viewing device may display a signal instructing the worker to pick an inventory item from the container. The worker may then proceed along the planned route to the container where the next inventory item in the customer's order is stored.

The software may determine the user's starting location using one or more of several methods. In an embodiment, indoor position tracking technology may identify the user's location through the user's mobile device which, in some embodiments, may also function as the user's augmented reality viewing device. The navigation system may identify the location of the mobile device, and consequently, the identity of the user, when the user logs into the navigation system using the mobile device. Thus, multiple users may simultaneously navigate throughout the area to be navigated while the system may track each unique user's movement and provide each user with individualized navigation instruction. In another embodiment, the bar code scanner, which may be disposed within the augmented reality viewing device the user is operating, may scan surrounding route bar codes, transmit the data to the processor through a data transmitter, and the instructions stored in the processor may identify the user's current location based on the surrounding route bar codes. In the latter embodiment, unique users may be distinguished from one another by assigning a specific augmented reality viewing device that em its a unique signal to each user and associating each device with its assigned user. Alternatively, a bar code may be disposed on the body or clothing of each user which defines the unique user. This bar code is referred to herein as a "user bar code." The bar code reader in the camera may scan the bar code on the body or clothing of the unique users to assess their locations. Alternatively, the user may scan his or her user bar code using a bar code reader associated with his or her assigned augmented reality viewing device to associate that device with the user. The bar code reader within the augmented reality viewing device may then scan surrounding route or destination bar codes and the instructions in the processor may identify the user's location.

Once the processor receives the data comprising the user's original position and desired destinations, the software may design the planned route from the user's original position to the user's desired destinations within the area to be navigated. In some embodiments, the software utilizes data which indicates the positions of obstacles, which may include equipment or other users (congestion), when designing the planned route. The software may dynamically assess the planned route as the user proceeds and may, under some circumstances, offer an alternative route. In an example, an alternative route may be offered when the user deviates from the planned route or when new obstacles are placed along the planned route making the original planned route less efficient. In some embodiments, the memory in the processor may store a record of the user's movement throughout the area to be navigated. The user or, for example, a business owner or employee supervisor, may retrieve and analyze the stored movement. This may be useful to study customer behavior or to assess employee efficiency. A planned route may also be stored in the memory and a user may retrieve the planned route to repeat the path later.

In some embodiments, the route bar codes are not visible to the human eye. Rather, the route bar codes may be printed using ink that either emits light comprising wavelengths which are outside the human visual range. As used herein, "human visual range" means light with a wavelength that is between about 420 nm and about 670 nm.

The disclosed navigational system may be used in a variety of environments through which a user may need navigational assistance. These environments may include the interior or buildings or an outdoor area. Examples of environments in which the navigation system may be employed include a warehouse, a retail store, an office building, a healthcare facility, an airport, a bus or train terminal, a school, a parking lot, an amusement park, and a city.

Referring now to the drawings, FIG. 1A Illustrates warehouse 100 which uses an embodiment of the disclosed navigation system. User 110 is wearing goggles 115 to which include a bar code reader and an augmented reality viewing device. User 110 has placed inventory item 120 on cart 130. Warehouse 100 includes stored items on pallets 140a and 140b. Pallet 140a is labeled with destination bar code 150a and pallet 140b is labeled with destination bar code 150b. Warehouse 100 further includes bins 170a-f which are each labeled with one of destination bar codes 180a-f respectively.

Figure 1B:
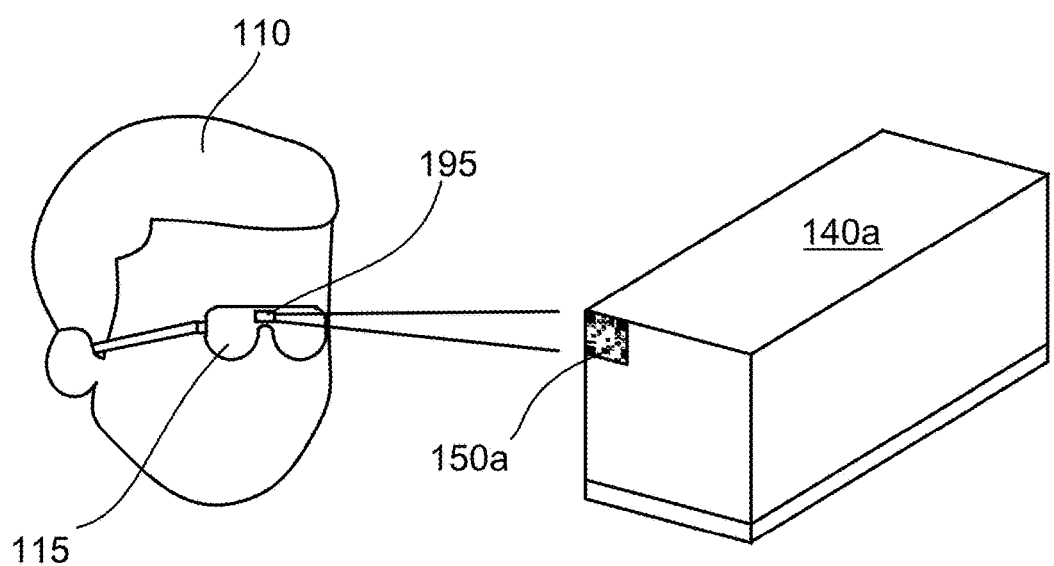
FIG. 1B is a perspective view illustrating a user wearing goggles which include a bar code reader according to an embodiment of the disclosed navigation system.

FIG. 1B illustrates user 100 wearing goggles 115 which include an augmented reality viewing device. Goggles 115 include bar code reader 195. User 110 is shown scanning destination bar code 150a on pallet 140a. User 100 views an augmented reality view through goggles 115 which provides navigational instruction.

Figure 1C:
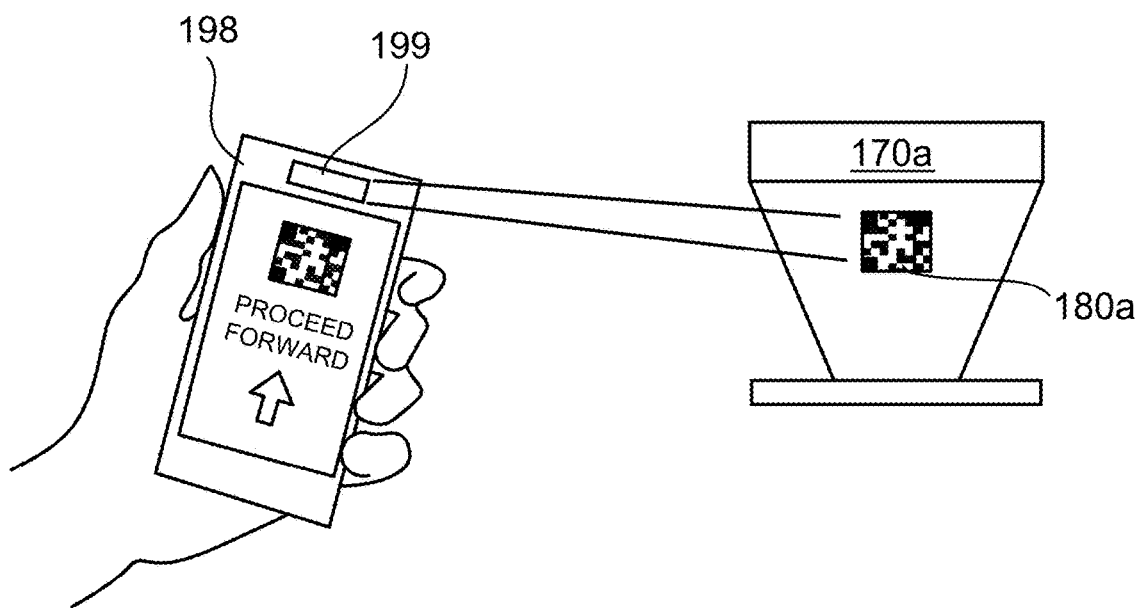
FIG. 1C is a perspective view illustrating a user operating a mobile device which includes a bar code reader according to an embodiment of the disclosed navigation system.

FIG. 1C shows another embodiment of the disclosed navigation system in which a user is operating mobile device 198 to scan destination bar code 180a on bin 170a. Mobile device 198 includes bar code reader 199 and functions as an augmented reality viewing device. In this embodiment, mobile device 198 functions in place of goggles 115 shown in FIG. 1A. The screen of mobile device 198 functions as a UI and displays an image of inventory bar code 180a, textual instructions, and an arrow all of which provide the user with navigational instruction.

Figure 2:
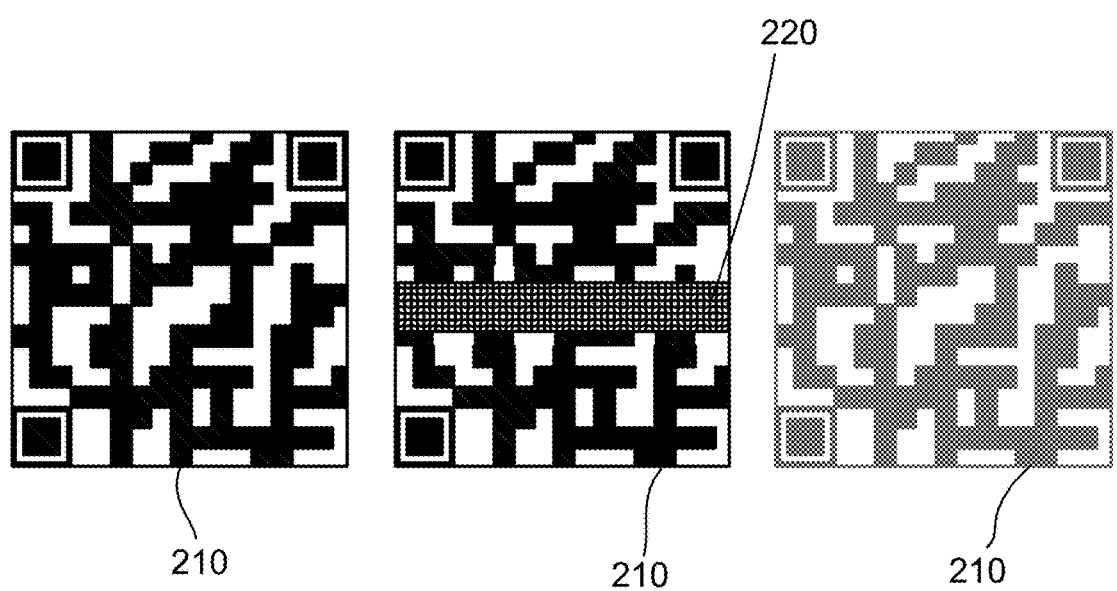
FIG. 2 is a schematic drawing of an example of an image shown on a user interface according to an embodiment of the disclosed navigation system.

FIG. 2 illustrates how a UI and augmented reality view may appear when a user scans a route bar code to determine whether it is on the planned route. Route bar code 210 is first shown in black on the far left of FIG. 2 before a user has scanned it. In the center, as the bar code reader scans route bar code 210, bar 220 is shown descending from top to bottom of route bar code 210 to indicate that scanning is in progress. On the far right, route bar code 210 has changed colors as indicated by the change from black (on the far left) to gray. This provides a visual indication to the user that route bar code 210 has been scanned and is on the planned route.

Figure 3:
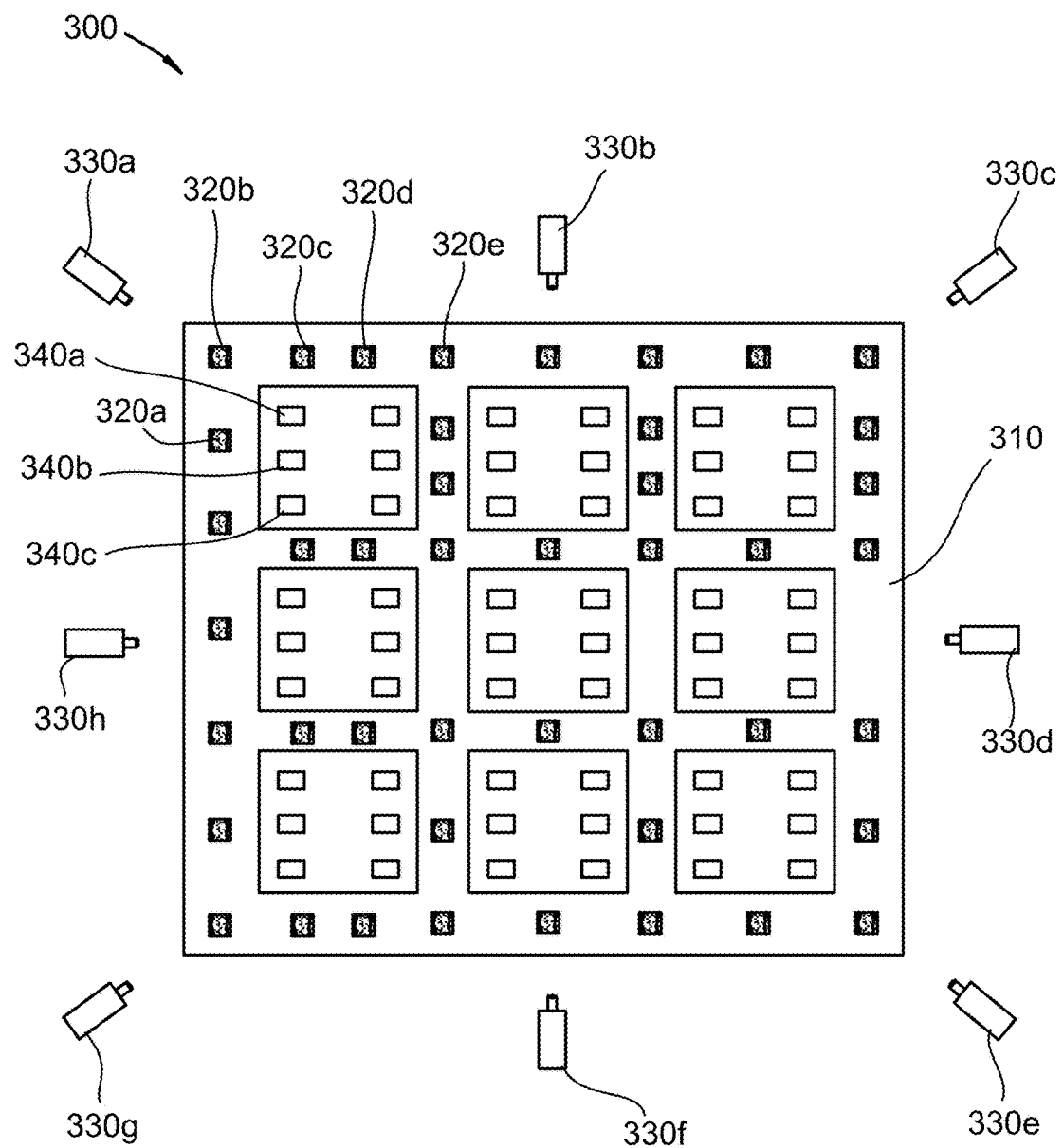
FIG. 3 is a schematic drawing illustrating a retail store using an embodiment of the disclosed navigation system.

FIG. 3 illustrates map 300 which shows the layout of a retail store which uses an embodiment of the disclosed navigation system. Map 300 shows pathway 310 on which users who are shoppers or store employees may travel to view or work with merchandise respectively. Route bar codes 320a-e are positioned along pathway of travel 310. Other route bar codes are also shown in FIG. 3 but are not labeled for purposes of clarity. Cameras 330a-h surround and are directed toward pathway 310. Cameras 330a-h may each include a bar code reader which may scan route bar codes 320a-e and other route bar codes placed along pathway 310. Merchandise displays 340a-c are shown along pathway 310. Other merchandise displays are illustrated in FIG. 3 but not labeled for purposes of clarity. Route bar codes 320a-e may direct users to merchandise displays 340a-c or other merchandise displays which are not labeled.

Figure 4:
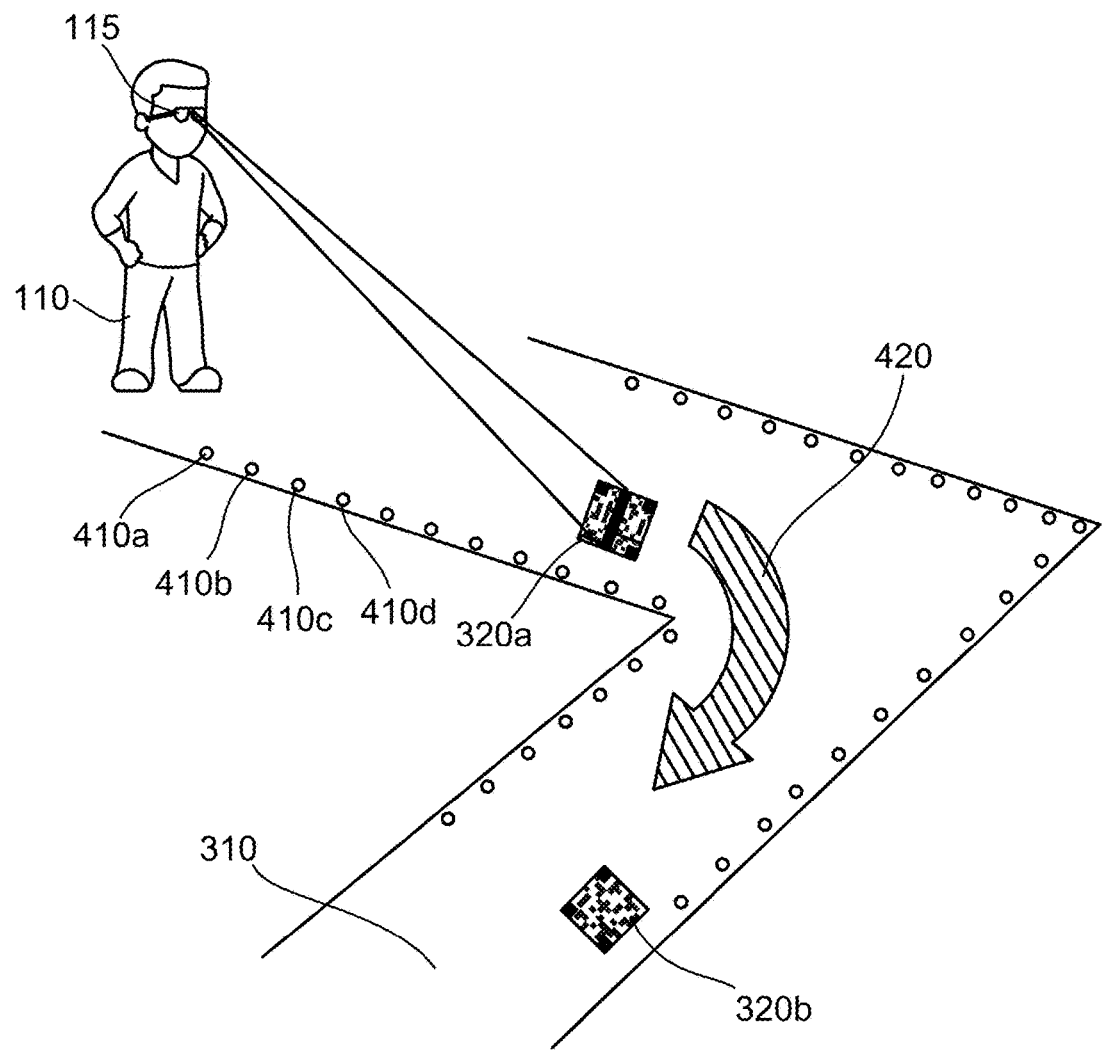
FIG. 4 is a perspective view illustrating a user scanning route bar codes on a floor within the retail store of FIG. 3 according to an embodiment of the disclosed navigation system.

FIG. 4 illustrates user 110 traveling along a section of pathway 310 within the retail store shown in FIG. 3. User 110 is wearing goggles 115 and using them to scan route bar code 320a. As user 110 moves further along pathway 310, he will scan route bar code 320b. Because route bar codes 320a and 320b are along the planned route, goggles 115 will display a UI which informs user 110 that he is proceeding to his desired location. In the embodiment shown in FIG. 4, the UI shows virtual track lights 410a-d which light up along the planned route just ahead of the user providing a signal to follow. Additional virtual track lights are shown, but not labeled, for purposes of clarity. In addition, virtual arrow 420 directs worker 110 along the planned route. These virtual signals may be used alone or in combination in various embodiments.

Figure 5:
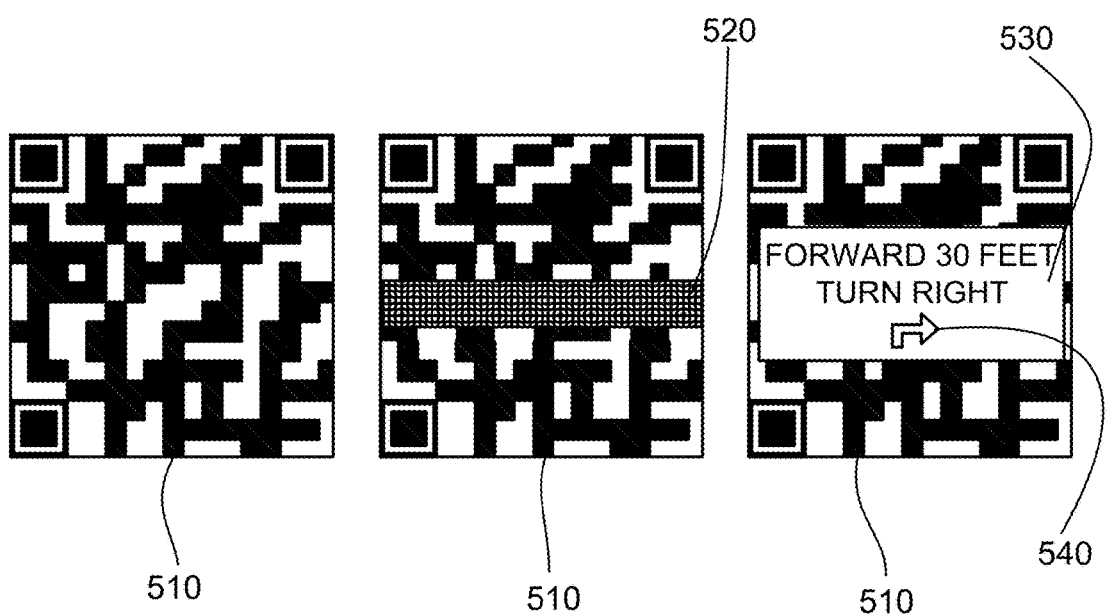
FIG. 5 is a schematic drawing of an example of an image shown on a user interface according to an embodiment of the disclosed navigation system.

FIG. 5 shows an embodiment of a UI that may be visible when a user scans a route bar code. Route bar code 510 is first shown on the far left of FIG. 5 before a user has scanned it. In the center, as the user scans route bar code 510, bar 520 is shown descending from top to bottom of route bar code 510 to indicate that scanning is in progress. On the far right, textual indicator 530 appears on route bar code 510 in the form of the instruction "FORWARD 30 FEET TURN RIGHT." Arrow 540 provides a graphic illustration of this instruction. Textual indicator 530 alerts the user that, to reach a requested location, the user must continue forward 30 feet and then turn right. Upon turning right, this instruction may be followed by additional instructions communicated through the UI.

Figure 6:
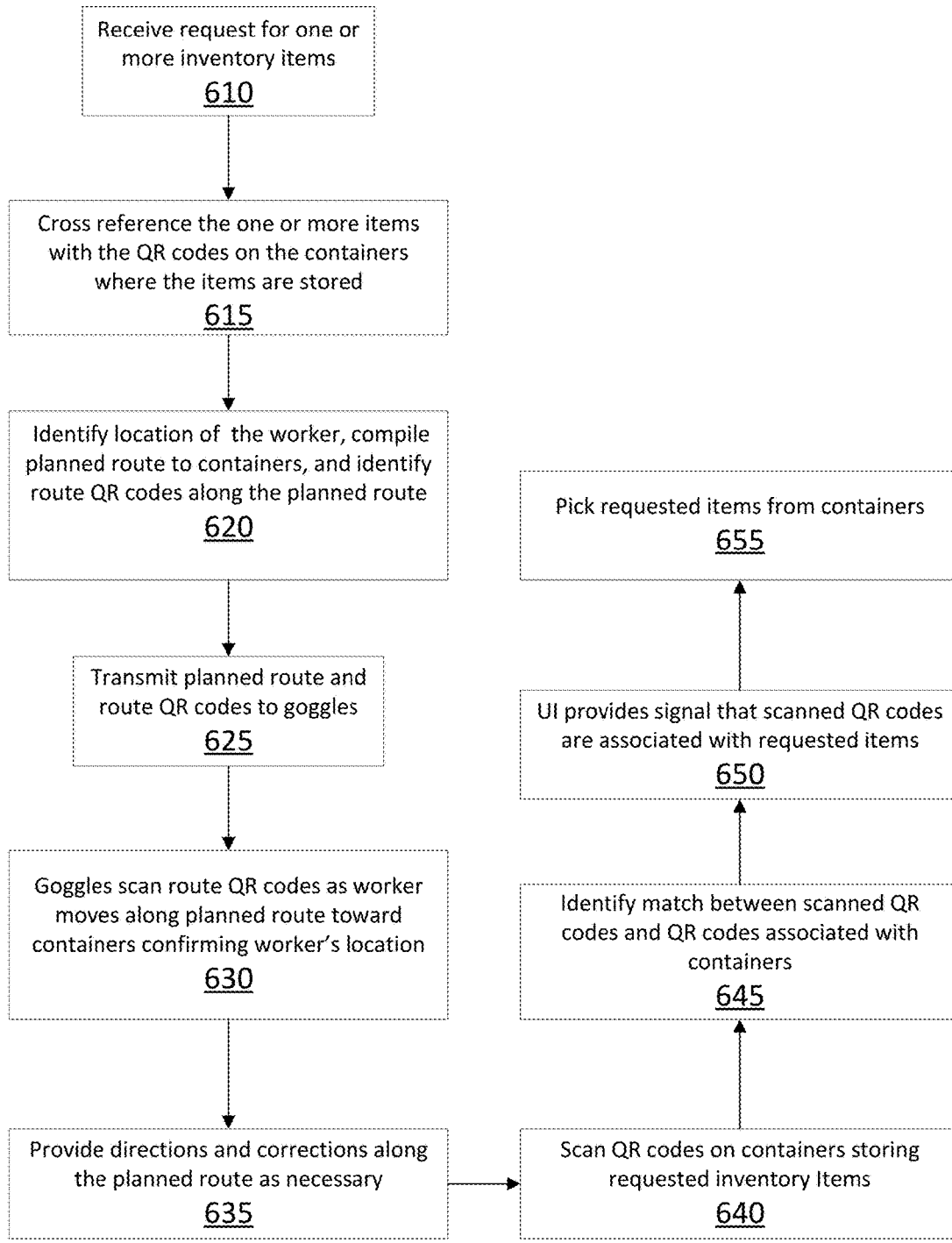
FIG. 6 is a flow chart illustrating steps which may be taken to use an embodiment of the disclosed navigation system.

FIG. 6 is a flowchart illustrating steps which may be taken when using an embodiment of the disclosed navigation system. In step 610, a worker receives a request from a customer to purchase one or more inventory items. Non-transitory computer-readable media within the warehouse management system cross-references the items with the destination bar codes on the containers which store each of the items (step 615). In this embodiment, the destination and route bar codes are QR codes. The navigation system then identifies the position of a worker who is assigned the task of picking the items to fill the order as described elsewhere herein (step 620). The non-transitory computer-readable medium within the navigation system then plans the most efficient route for the worker to take to pick the items in the customer's order (the planned route). In doing so, the route bar codes along the planned route and the order in which the worker should encounter them will be determined according to a warehouse map stored in the processor. The planned route and the location and route bar codes along the planned route are then transmitted to the workers goggles (step 625). The worker begins moving through the warehouse to begin picking the items. As the worker does so, the worker's goggles scan route bar codes (route QR codes, in this example) along the planned route to identify the worker's current location (step 630). The navigation system communicates instructions to the worker through the augmented reality viewing device in the goggles to inform the worker of the steps along the planned route. If the worker deviates from the planned route, corrections to return to the planned route are also communicated through the UI shown through the goggles (step 635).

As the worker travels along the planned route, the bar code scanner in the worker's goggles scans destination bar codes (QR codes, in this example) on containers. When the worker arrives at a container which stores one of the requested inventory items, the bar code reader scans the associated destination bar code (step 640). The software within the navigation system then identifies a match between the scanned destination bar code and a requested inventory item (step 645). The UI that the worker views through the goggles signals that the scanned destination bar code is associated with a requested inventory item (step 650) to alert the worker to pick the item. The worker then picks the inventory item from the container (step 655).

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

We claim:
1. A navigation system comprising:
a plurality of route bar codes, wherein the plurality of route bar codes is disposed throughout an area to be navigated;
at least one bar code reader;
at least one camera;
an augmented reality viewing device;
a processor, wherein the processor comprises:
a database comprising:
a stored pattern and position of each of the plurality of route bar codes; and
non-transitory computer-readable medium comprising instructions for:
receiving a request to navigate from a starting point of a user to at least one destination within the area to be navigated;
identifying the starting point of a user;
assembling a planned route from the starting point of the user to the at least one destination within the area to be navigated; and
communicating the planned route to the user by displaying a composite view of a computer-generated image and a real-world image through the augmented reality viewing device
wherein the computer-generated image comprises a graphical image of at least one of the plurality of route bar codes when the bar code reader scans the at least one of the plurality of route bar codes, and wherein the graphical image changes colors when the at least one of the plurality of route bar codes is within the planned route.

2. The navigation system of claim 1, wherein the at least one camera comprises a plurality of cameras statically positioned throughout the area to be navigated.

3. The navigation system of claim 1, further comprising a plurality of destination bar codes, wherein the pattern and position of each of the plurality of destination bar codes is stored in the database; and wherein each of the plurality of destination bar codes is disposed at a destination within the area to be navigated.

4. The navigation system of claim 1, wherein the computer-generated image comprises virtual track lighting.

5. The navigation system of claim 4, wherein a section of the virtual track lighting along the planned route comprises a first color; and wherein a section of the virtual track lighting exterior to the planned route comprises a second color.

6. The navigation system of claim 1, wherein the computer-generated image comprises a virtual arrow pointing along the planned route.

7. The navigation system of claim 1, wherein the plurality of route bar codes comprises a 3D bar code.

8. The navigation system of claim 1, wherein the non-transitory computer-readable medium further comprises instructions for actuating an audible signal, the audible signal comprising navigation instruction to the user.

9. The navigation system of claim 1, wherein the augmented reality viewing device comprises one or more of the following list: goggles, eyeglasses, a visor, an ocular contact lens, a mobile device, a computer screen, and a camera.

10. The navigation system of claim 1, wherein the plurality of route bar codes comprises an ink which reflects light comprising a wavelength which is outside the human visible range.

11. The navigation system of claim 1, wherein at least one of the at least one bar code readers is disposed within a mobile device.

12. The navigation system of claim 1, wherein a user bar code is assigned to and disposed upon a body or clothing of each of a plurality of defined users.

13. The navigation system of claim 12, wherein the non-transitory computer-readable medium further comprises instructions for determining a location of each of the plurality of defined users.

14. The navigation system of claim 1, wherein the non-transitory computer-readable medium further comprises instructions for assembling a revised route when the user deviates from the planned route.

15. The navigation system of claim 1, wherein the processor further comprises a memory; and wherein the memory stores a record of the user's movement throughout the area to be navigated.

16. The navigation system of claim 1, wherein the augmented reality viewing device is assigned to the user; wherein the processor further comprises a memory; and wherein the memory stores a record of the user's movement throughout the area to be navigated.

17. The navigation system of claim 1, wherein the at least one camera comprises one of the at least one bar code reader.

18. The navigation system of claim 1, wherein at least one of the at least one bar code reader is disposed within the augmented reality viewing device.

19. The navigation system of claim 1, wherein the area to be navigated comprises one or more of the following list: a warehouse, a retail store, an office building, a healthcare facility, an airport, a bus terminal, a train terminal, a school, a parking lot, an amusement park, and a city.

* * * * *